United States Patent Office 3,303,528
Patented Feb. 14, 1967

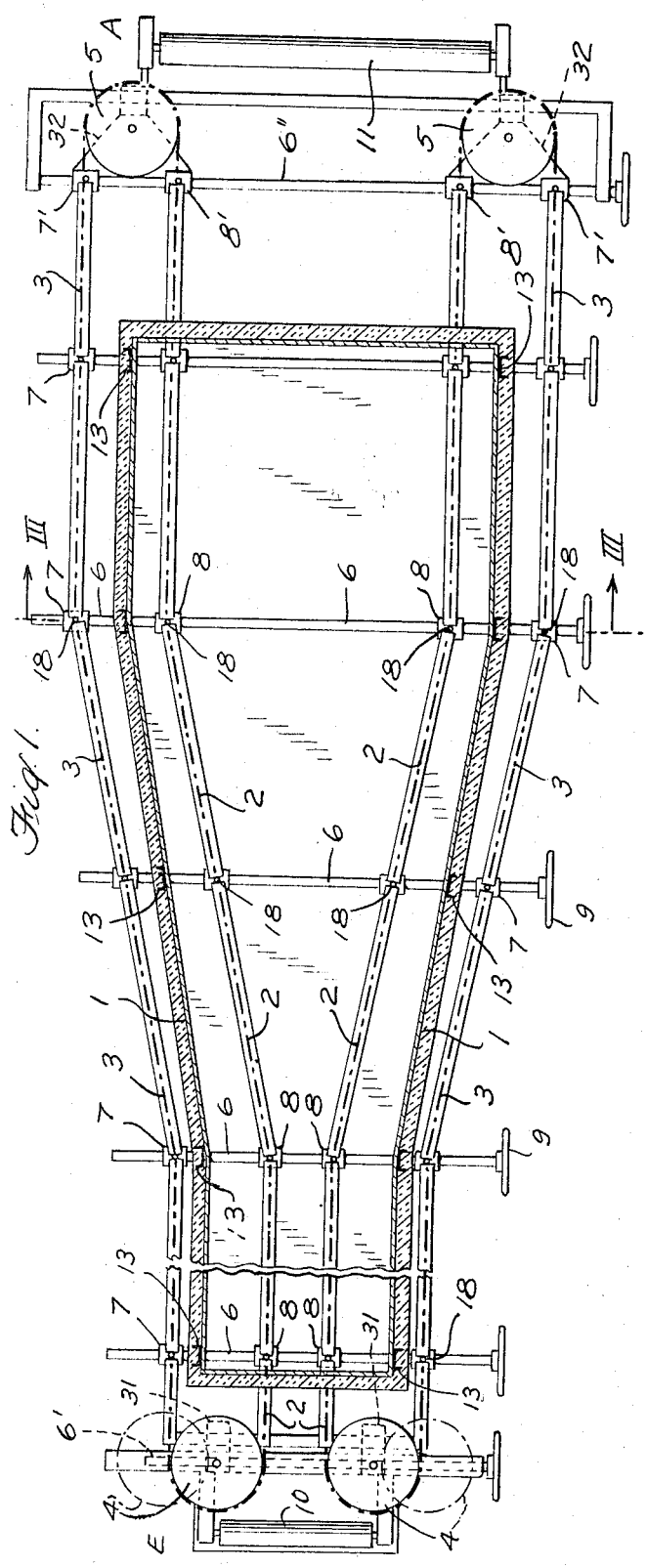
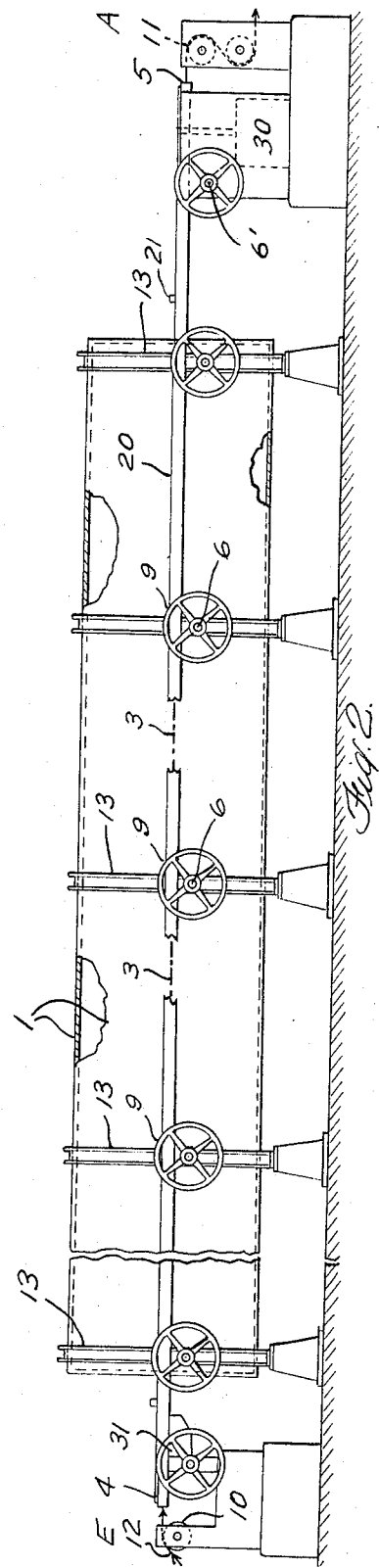

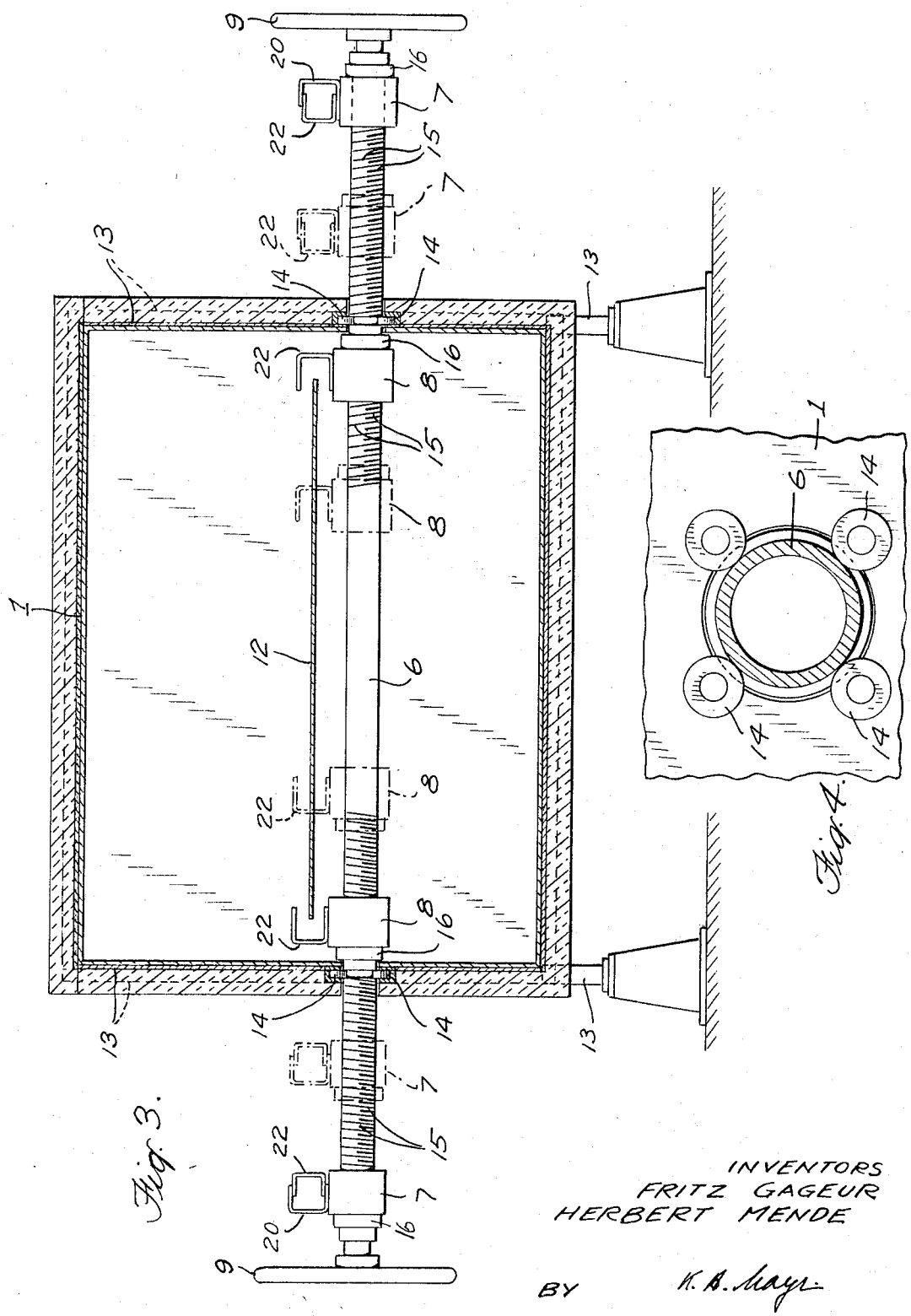

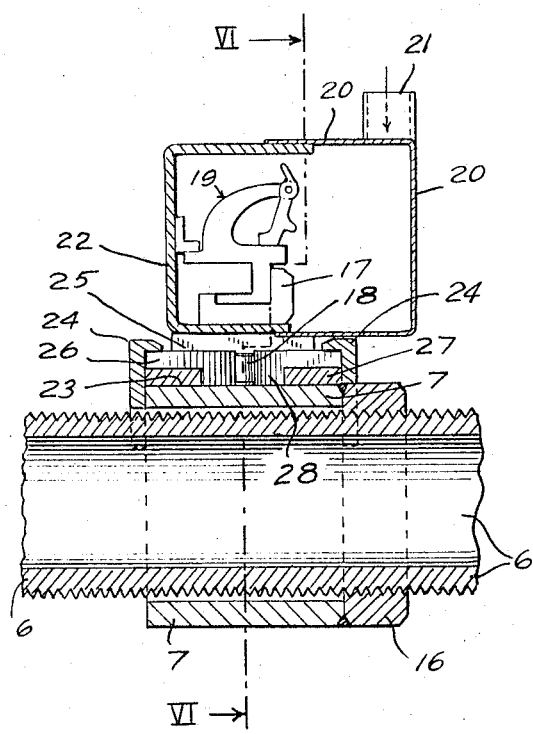
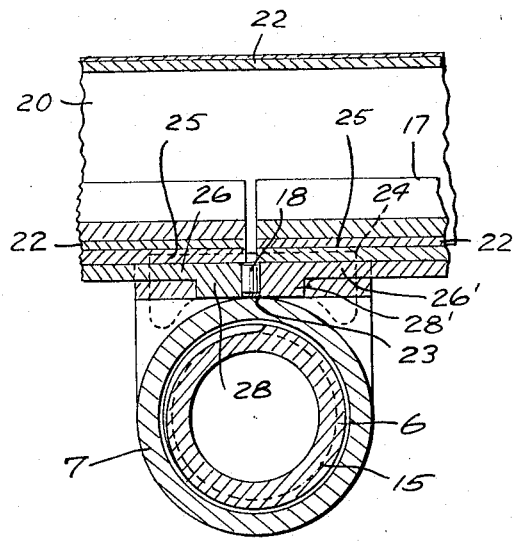
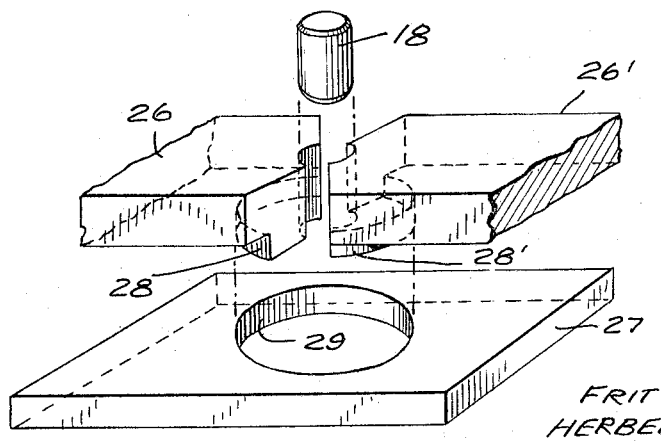

3,303,528
APPARATUS FOR LATERALLY STRETCHING LENGTHS OF THERMOPLASTIC SYNTHETIC MATERIAL
Fritz Gageur, Lindau, and Herbert Mende, Friedrichshafen-Manzell, Germany, assignors to Lindauer Dornier Gesellschaft m.b.H., Lindau (Bodensee), Germany
Filed Nov. 25, 1964, Ser. No. 413,767
Claims priority, application Germany, Nov. 26, 1963, L 46,419
9 Claims. (Cl. 18—1)

The present invention relates to apparatus for transversely or laterally stretching continuous thermoplastic films.

In order to produce thin films from lengths of thermoplastic synthetic foil material and to impart special strength and structural properties to the film, the foil material is subjected to stretching during the production process. This stretching may be done longitudinally or transversely, or in both directions.

The invention is concerned with an apparatus for effecting lateral stretching of continuous film material. The apparatus is on both longitudinal sides provided with an endless traveling tenter clip chain whose clips grip the lateral edges of the continuous synthetic film and stretch the latter between the opposed chains. The chains diverge at least on a portion of their paths for effecting lateral stretching of the film to a thin foil of synthetic material.

In conventional stretching apparatus of the tenter clip chain type problems must be solved which involve considerable economic disadvantages and structural difficulties. This is particularly true if great traveling speeds of the continuous film within the apparatus are desired. These problems primarily concern heating and cooling whereby heating causes a great continuous operating expense. Energy is not only required for heating the film but also for continuously replacing the great heat loss of the heated space. Aside from the quality and the thickness of the material used for insulating the casing of the apparatus an important item is the heat lost through slots through which the treated material enters and leaves the apparatus. It must be considered that not only the thin film passes through the slots but also the advancing and returning runs of the tenter clip chains at the right side and the left side of the film pass through the slots. The clip chains must be laterally displaceable to accommodate films of different width. The slots for passing the film must be accordingly wide and it is difficult to prevent escape of heat therethrough. Since the entire apparatus is enclosed the volume and surface of the casing are great and heat losses by radiation are considerable in spite of insulation.

An additional heat loss is caused by cooling the returning tenter clip chain which is necessary to assure effective gripping of the film entering the apparatus and to avoid excessive softening of the film by the hot tenter clips. In conventional arrangements this cooling causes great difficulties because the chain runs in the closed and heated casing of the apparatus, with the exception of short pieces at the inlet and outlet. The temperature in the casing is 200° C. or higher. Cooling in a hot space is not simple. In conventional apparatus the returning run of the clip chain is guided in a closed channel into which cooling air is blown. In conventional machines having chain runs of 60 feet and longer subdivision of the cooling channel is necessary and several coolant supply and release conduits must be arranged alongside the chain runs. Since the chain runs are laterally displaceable within the apparatus casing between a minimum and maximum film width the aforementioned coolant conduits must be flexible and heat-insulated, because they are placed within the heated casing. This involves great structural difficulties. The fact alone that in conventional apparatus the clip chains must be cooled within the heated casing causes an undesired heat loss in the heating space if the clip-chain cooling is efficient.

It is an object of the invention to provide an apparatus for transverse stretching lengths of thermoplastic synthetic material which avoids the aforedescribed disadvantages of conventional stretching apparatus. This is achieved by providing reversing devices for the clip chains at the inlet and the outlet of the apparatus which effect lateral spacing between the advancing and returning runs of the clip chains which lateral spacing is greater than one half of the difference between maximum and minimum inlet width and between maximum and minimum width of the film after stretching, respectively. The return runs of the clip chains are outside of the casing of the apparatus whereby the individual parts of the chain track for the advancing and returning chain are parallelogramlike displaceable. With this structure the insulated side walls of the apparatus casing may be close to the advancing inner chain runs when the latter are in position for maximum film width. The described structure makes it possible to reduce the dimensions of the apparatus casing and its surface whereby the radiation losses and the initial cost of the insulating material are reduced. The slots for conducting the chains into and out of the casing and for conducting the film into the casing and removing the film from the casing are smaller than in conventional arrangements because only the forward runs of the clip chains must be accommodated in the casing.

An important advantage of the structure according to the invention is that no cooling is effected within the heating chamber and the considerable heat loss connected therewith in conventional apparatus is avoided. The return runs of the chains which are outside of the apparatus casing in a relatively cool room can be effectively cooled with much more simple means than those required in conventional apparatus. The inlet and outlet for the cooling air need not be insulated. If the return run of the clip chain is conducted through a duct through which cooling air is passed this duct can be made very light and does not require heat-insulation. The entire outside chain track can be made simple and light relative to the chain tracks within the apparatus casing which must absorb the entire forces from the film to be stretched. Return of the clip chain outside of the casing facilitates access to the clip chain.

Connection of the individual parts of the chain track is done parallelogramlike by pivots. Since the chain track guides are close to the pivots or are even running across the pivots large gaps at the bends of the chains are avoided when the angle of the bend is changed. Therefore, the chains run evenly and the stresses are balanced at all operating positions of the chain tracks.

In a further development of the invention the chain track is supported by spindle traverses which project laterally from the casing of the apparatus. These traverses are rotatably supported by upright spars in the lateral walls of the casing or by longitudinal reinforcements connecting two spars. Bearings comprising a plurality of rollers arranged around the spindle may be provided. The end portions of each spindle are threaded in opposite hands. The threads at the end portons of the spindle are cut away to accommodate the bearings. A pair of nut members is screwed onto each threaded spindle end. One of the nut members of each pair is inside the casing and the second nut member of each pair is outside of the casing. If rotation of the nut members is prevented and the spindle is rotated, the pairs of nut members move in opposite directions. Elements are connected to the nut members for supporting the previously mentioned pins for articulating the adjoining ends of chain track sections. For adjusting the distance between the inner runs of the chains to suit different film widths each spindle is provided with a handwheel which must be big enough to easily impart the torque needed for rotating the spindles but which can be of simple structure. Expensive gearing for rotating the spindles is unnecessary. The spindles do not only serve for supporting the chain tracks but also serve for adjusting the distance between the chains. This greatly simplifies the stretch apparatus.

The mechanisms for reversing the direction of movement of the chains at the inlet and outlet of the apparatus are preferably so devised that the lateral offset of the forward and return runs of the chains is not produced by a plurality of small reversing wheels but by a single reversing disc or a chain wheel of large diameter. At a given advancing speed of the film and corresponding chain speed the centrifugal forces acting on the chain clips at the reversal points are small and the apparatus can be operated at high production speeds with conventional tenter clip chains. If the reversal radius is small the centrifugal forces increase excessively at increasing chain speed, making necessary strong and expensive chains. The chain forms a polygon at the reversal location and the angles formed by the clips are unduly great if small reversing wheels are used. The large diameter of the reversing wheel used according to the invention accommodates a number of conventional clips so that the angle formed by consecutive clips is small. This assures smooth running of the chains. The effect of the enlargement of the reversal radius is known and would improve operation of conventional stretching apparatus. Here, however, special guide means would be required to move the returning chain run close to the advancing run and onto a common clip chain carrier.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

FIG. 1 is a schematic plan view of a stretching apparatus according to the invention, with the top of the casing removed.

FIG. 2 is a simplified schematic elevation of the stretching apparatus.

FIG. 3 is a schematic cross-sectional view of the stretching apparatus, the section being made along line III—III of FIG. 1.

FIG. 4 is a part-sectional schematic illustration of a spindle bearing.

FIG. 5 is an enlarged longitudinal sectional illustration of a track position adjusting means according to the invention.

FIG. 6 is a cross-sectional view of the track position adjusting means shown in FIG. 5, the section being made along line VI—VI of FIG. 5

FIG. 7 is an exploded perspective illustration of a portion of the adjusting means shown in FIGS. 5 and 6.

FIGS. 1 and 2 illustrate the general structure of a stretching apparatus according to the invention. Letter E designates the inlet and letter A the outlet of the stretching apparatus. Numeral 12 designates the material to be stretched which enters the apparatus at E over a roller 10. The stretched material leaves the apparatus at A, traveling partly around rollers 11. Tenter clip chains run at either side of the apparatus between the inlet and the outlet thereof. The advancing runs of the chains are designated by numeral 2 and the returning runs by numerals 3. The chains are indicated by dash-dot lines. In contradistinction to conventional arrangements wherein the carriers or tracks for the advancing and returning runs of the chains are combined and are within the casing of the apparatus, in the arrangement according to the invention the chain runs are separated and only the advancing runs 2 are located within the apparatus casing 1; the returning runs 3 are placed outside of the casing. The chain-reversing devices at the inlet and outlet of the apparatus are formed of large-diameter chain wheels 4 and 5.

The ends of the track sections which guide and support the chains are carried by spindles 6 extending transversely through the stretching apparatus. These spindles are preferably supported on vertical spars 13 which reinforce the side walls of the casing 1. The ends of the spindles are provided with threads of opposite hands and mating with internal threads of nut elements 16 (FIG. 5). The latter are individually connected to supports 7 supporting adjoining ends of track sections for the return runs 3 of the chains which are outside of the casing 1 and to supports 8 supporting adjoining ends of track sections for the forward runs 2 of the chains which are inside of the casing 1. When rotating the spindles 6 in one direction the supports, 7, 8 of the tracks of one chain are moved toward the supports 7, 8 of the tracks of the second chain and when rotating the spindles 6 in the opposite direction the supports 7, 8 of the tracks of one chain are removed from the supports 7, 8 of the tracks of the second chain. Pivots 18 are placed between the adjoining ends of the chain track sections. The advancing chain portions 2 are shown relatively close together at the inlet of the apparatus, corresponding approximately to the position of the chain tracks for minimum width of the film entering the apparatus.

The sprocket wheels 4 shown in dotted lines are in the outermost position, corresponding to maximum width of the film entering the apparatus. The diameter of the chain wheels 4 must be greater than the extent of displacement of the chain paths when adjusting the apparatus from a minimum to a maximum inlet width of the film to be treated. The diameter of the chain wheels must also be great enough to accommodate the elements 7, 8 and parts connected thereto and the wall thickness of the insulated apparatus casing. The diameter of the chain wheels 5 at the outlet of the apparatus must be correspondingly large. This diameter must be greater than the extent of the lateral chain displacement at the outlet of the apparatus or, in other words, must be larger than one half of the difference between the minimum and the maximum width of the stretched films and must also be sufficiently great to accommodate the elements 7, 8 and parts connected thereto and the thickness of the wall of the casing. In FIG. 1 the distance between the chains shown at the outlet A corresponds approximately to the maximal stretching width.

The elements of the pairs of elements 16, 7 and 16, 8 on the spindles 6 on either side of the apparatus remain equally spaced during actuation of the spindles. If the position of these elements is changed by rotating the spindles there is a parallelogram-like displacement of the track sections for the advancing and returning runs 2 and 3.

FIG. 3 is a cross-section of the stretching apparatus at a somewhat larger scale than that of FIG. 1 and shows the arrangement of the casing which is heat-insulated all around and rests on pedestals. FIG. 3 also shows the spars 13 wherein bearings 14 for the spindles 6 are supported. One end of each spindle is provided with a right-handed thread and the second end with a left-handed thread. The nut elements 16 are screwed on said threads and connected to the supports 7 and 8. The adjoining ends of the tracks for the advancing chain runs 2 and the returning chain runs 3 are on top of the supports 8 and 7, respectively, which are shown in solid lines in position for maximum width of the film 12 and in dotted lines in the position for minimum film width. The heating devices, blow nozzles, and the like, which are needed for the stretching operation are not shown. Handwheels 9 are mounted on the overhung ends of the spindles 6. These handwheels must be so large that the torque needed for displacing the nut elements 16 on the spindles 6 can easily be provided. These handwheels are of simple structure and do not require additional gears.

FIG. 4 is a cross-section of the part of the spindle 6 which is borne in a spar 13. The bearing for the spindle comprises a plurality of rollers 14 which extend to the bottom of the thread 15 which at this location is cut away to form an annular groove accommodating the rollers 14.

As shown in FIG. 6 the top surface 23 of the support element 7 is flat and slidably supports a plate 27 having a circular hole 29 (FIG. 7). Adjoining ends 26, 26' of two track sections rest on the plate 27 and are provided with substantially semicircular protuberances 28, 28' fitting into the hole 29. The neighboring ends of the track ends 26, 26' are provided with substantially semicircular recesses accommodating a pivot 18 resting on the surface 23. To permit angular movement of the track ends 26, 26' the opposite end faces thereof are slanted, as shown in FIG. 7. Each track section is provided with a beam 25 on which a casing 22 is mounted which, on the tracks inside the casing 1 is open toward the longitudinal center of the casing 1. Also mounted on the beam 25 is a guide rail 17 for guiding a clip chain 19 in the conventional manner. The weight of the parts 25–27 prevents turning of the support 7 on the spindle 6. To additionally safeguard against turning, brackets 24 may be provided.

FIG. 5 shows the arrangement for a return run of the clip chain which must be cooled. For this purpose the right side of the casing 22 is closed by a closure 20 and cooling air is admitted to and removed from the duct formed by the parts 20 and 22 through inlets or outlets 21. The structure of the cooling duct 20, 22 may be very simple because no insulation is required.

The lateral displacement of the sprocket wheels 4 and 5 is effected similar to the lateral displacement of the adjoining ends of the track sections. The wheels 4 are supported by support elements 31 riding on a spindle 6'. The wheels 5, which are driven by motors 30, are supported by triangular elements 32 connected to support elements 7', 8' riding on a spindle 6''. The elements 31 and 32 are preferably provided with parts slidably supported by elements forming part of the frame of the stretching apparatus.

We claim:
1. An apparatus for laterally stretching thermoplastic synthetic continuous films, comprising:
   an oblong casing having two opposed lateral walls and an inlet and an outlet for the films to be stretched,
   two endless tenter clip chains, one each of said chains being disposed alongside a respective one of said lateral walls,
   each of said chains having a forward run inside said casing and a return run outside of said casing, all of said runs being in a common horizontal plane,
   reversing mechanisms for said tenter clip chains at the inlet and at the outlet of said casing,
   track means for guiding the forward and return runs of said chains, each of said track means being subdivided into a plurality of longitudinal sections whose adjoining ends are movably connected,
   said sections of said track means for the forward and return runs of each chain being disposed in pairs having adjoining ends,
   a plurality of spindles projecting through said casing,
   connecting means operatively interconnecting each of said spindles with four of said pairs of said adjoining ends on said forward and return runs,
   a first two of said four pairs being disposed outwardly of said casing and a further two of said four pairs being disposed internally of said casing,
   said connecting means including means for moving said first two and said further two of said four pairs of said adjoining ends in opposite directions for changing the distance between said forward runs for laterally stretching films of different width,
   each of said reversing mechanisms including tenter clip chain-guide means for reversing the direction of movement of the respective chain, said guide means laterally offsetting said forward and return runs of the respective chains to an extent which is greater than one half of the difference between the maximum and minimum width of the films stretched in the apparatus,
   each of said reversing mechanisms including means for laterally moving said guide means toward and from one another, for changing the distance between said chains for laterally stretching films of different width.

2. An apparatus according to claim 1 further comprising a plurality of upright arms reinforcing said casing, each of said spindles being rotatably supported in two of said upright arms.

3. An apparatus according to claim 1 wherein said connecting means includes pivotal connection means between said adjoining ends of each of said four pairs.

4. An apparatus according to claim 3 wherein said connecting means further comprises bracket means in contact with said pivotal connection means, said bracket means being effective to prevent turning of said connecting means on said spindle.

5. An apparatus according to claim 3 wherein said connecting means interconnecting said spindles and said further two of said four pairs of said adjoining ends are provided with casing means enclosing said forward runs of said two chains, said casing means being open toward the longitudinal center of said casing.

6. An apparatus according to claim 5 wherein said connecting means interconnecting each of said spindles with said first two of said four pairs of said adjoining ends are provided with casing means including casing members each having an open side and enclosing said return runs of said chains on three sides, said casing means further including closure members closing casing members and forming therewith cooling air ducts for said return runs.

7. An apparatus according to claim 1, wherein said track sections of said two chains are disposed mirror-symmetrically with respect to the longitudinal center line of said casing.

8. An apparatus according to claim 1, wherein said guide means are in the form of chain wheels whose diameter corresponds to the extent of lateral offset of said forward and return runs.

9. An apparatus according to claim 1, wherein said connecting means operatively connecting said spindles with four of said adjoining ends comprise right-hand and left-hand threaded means connecting said spindles with said first two of said four pairs of said adjoining ends, said connecting means further comprising right-hand and left-hand threaded means connecting said spindles with said further two of said four pairs of said adjoining ends.

References Cited by the Examiner

UNITED STATES PATENTS

| | | | |
|---|---|---|---|
| 2,187,254 | 1/1940 | Wallace | 18—6 |
| 2,441,235 | 5/1948 | Blair et al. | 18—4 |
| 2,473,404 | 6/1949 | Young | 18—1 |
| 2,728,941 | 1/1956 | Alles et al. | 18—1 |
| 2,779,969 | 2/1957 | Bose | 18—6 X |
| 2,817,875 | 12/1957 | Harris et al. | 18—4 |
| 3,066,351 | 12/1962 | Schiner | 18—4 X |
| 3,066,377 | 12/1962 | Waterman. | |
| 3,150,433 | 9/1964 | Kampf | 18—1 X |
| 3,175,245 | 3/1965 | Kreeft et al. | 18—1 |
| 3,179,976 | 4/1965 | Nash | 18—1 |
| 3,179,977 | 4/1965 | Nash | 18—1 |

FOREIGN PATENTS

| | | |
|---|---|---|
| 1,330,655 | 5/1963 | France. |
| 971,737 | 10/1964 | Great Britain. |

WILLIAM J. STEPHENSON, *Primary Examiner.*